March 11, 1941.  R. S. DRUMMOND  2,234,553
MULTIPLE STATION SURFACE FINISHING MACHINE
Filed Nov. 29, 1937   11 Sheets-Sheet 1

*INVENTOR*
ROBERT S. DRUMMOND
BY
*ATTORNEYS*

March 11, 1941. R. S. DRUMMOND 2,234,553
MULTIPLE STATION SURFACE FINISHING MACHINE
Filed Nov. 29, 1937 11 Sheets-Sheet 2

INVENTOR
ROBERT S. DRUMMOND
BY
Whittemore, Hulbert & Belknap
ATTORNEYS

March 11, 1941.    R. S. DRUMMOND    2,234,553
MULTIPLE STATION SURFACE FINISHING MACHINE
Filed Nov. 29, 1937    11 Sheets-Sheet 3
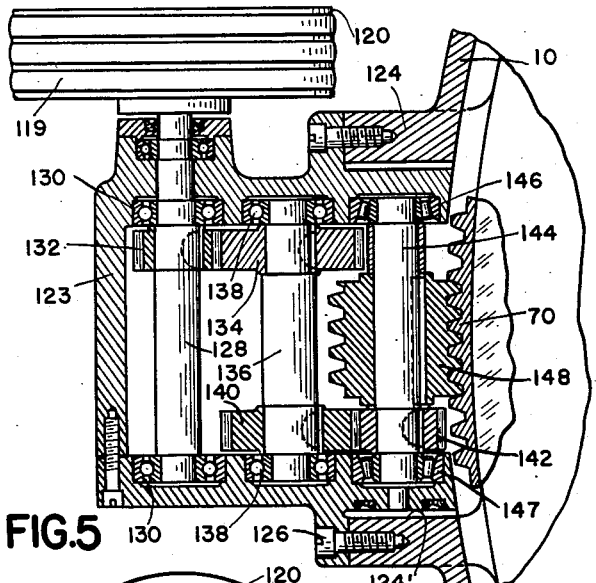
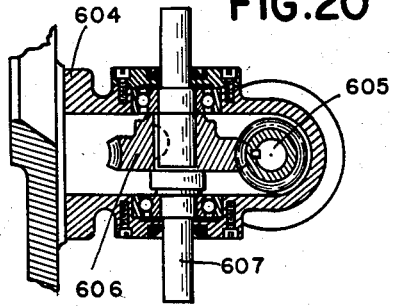
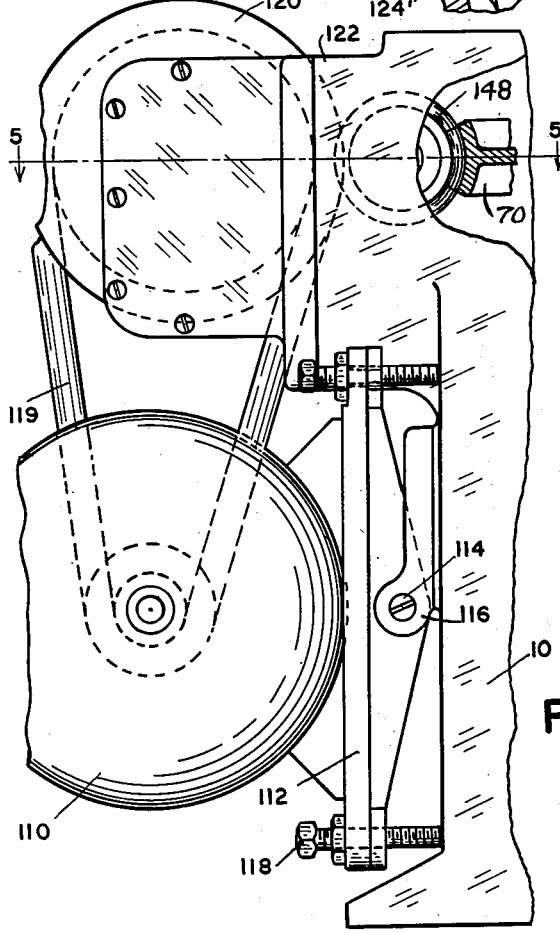
INVENTOR
ROBERT S. DRUMMOND
BY
Whittemore, Hulbert & Belknap
ATTORNEYS

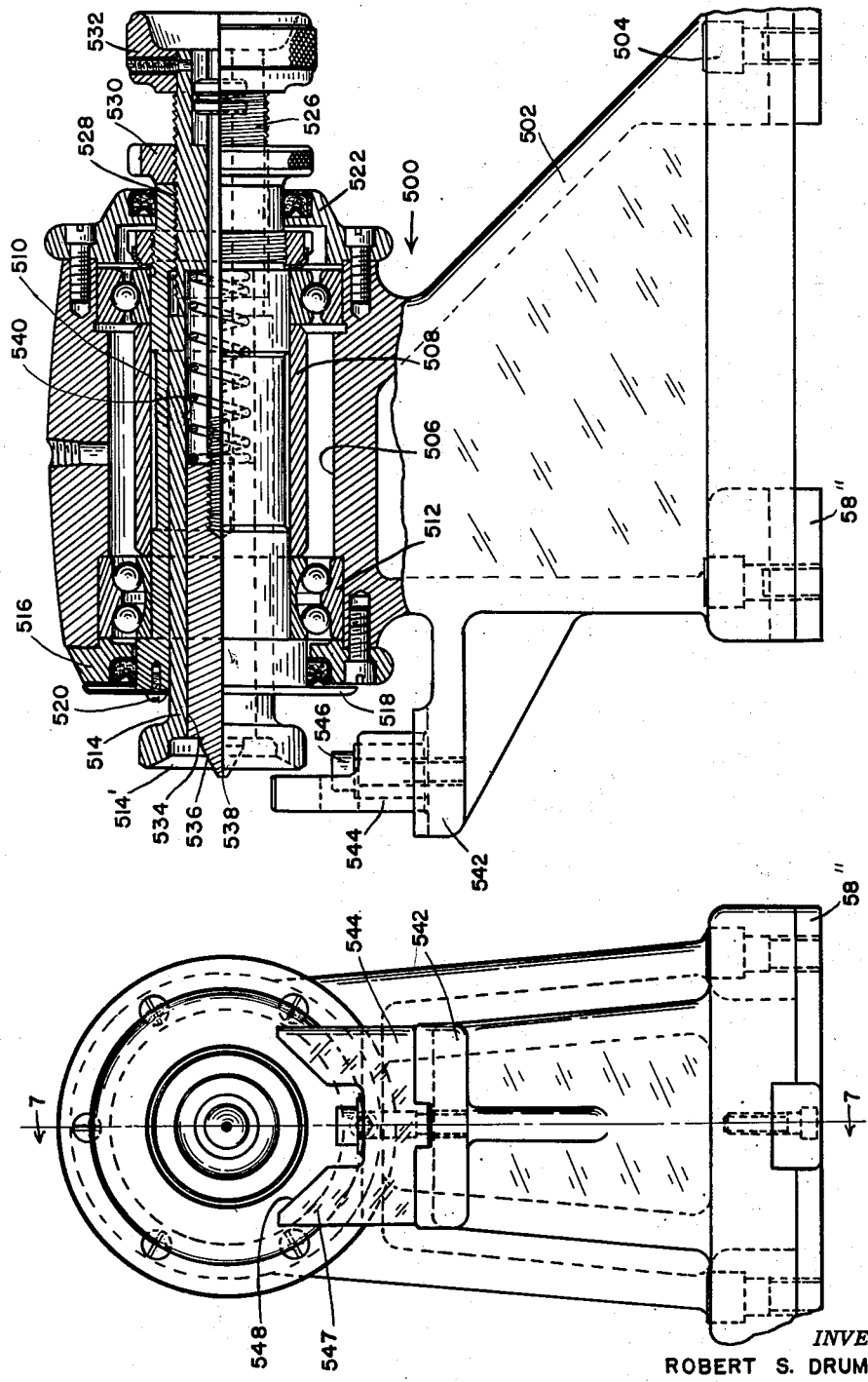

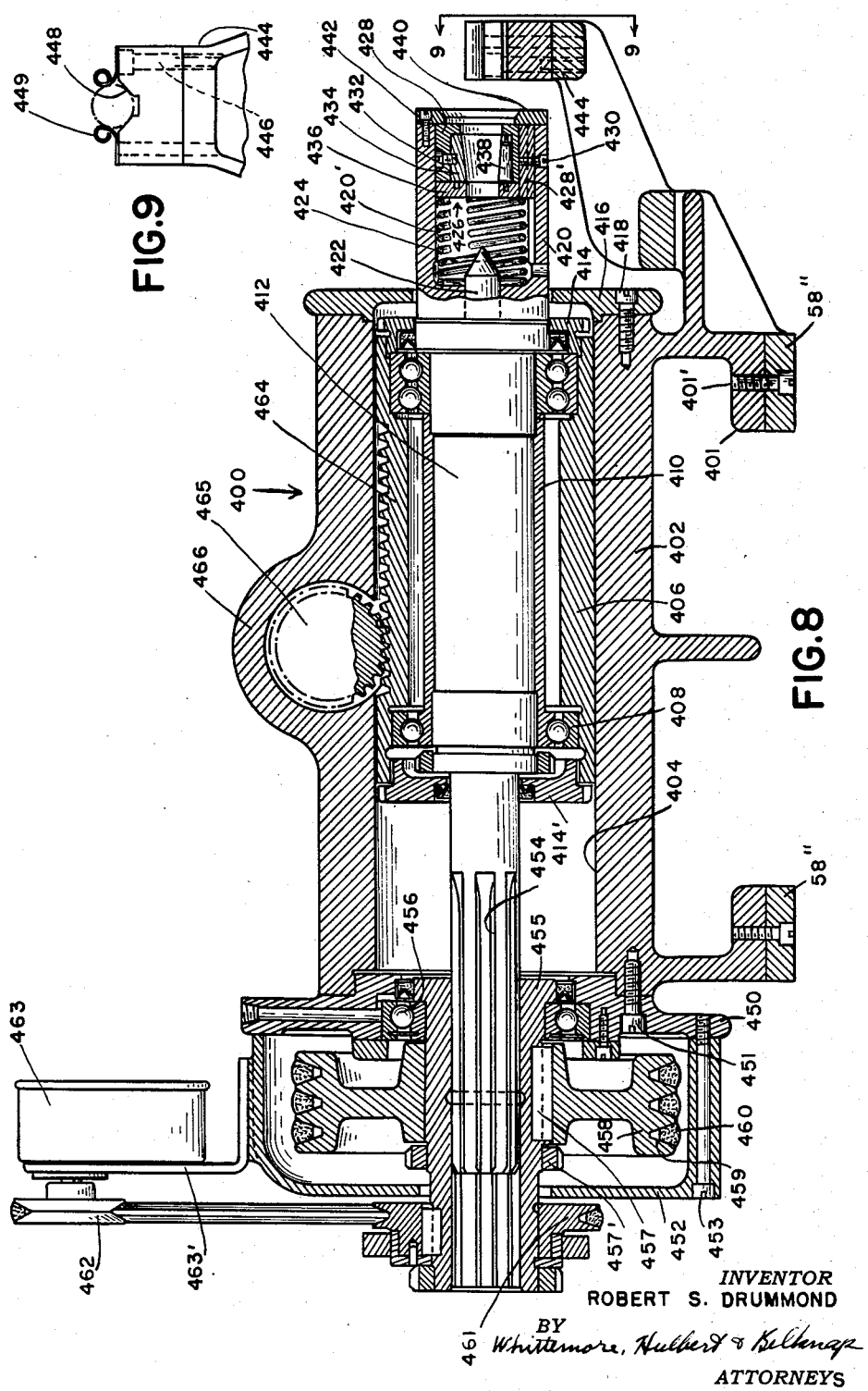

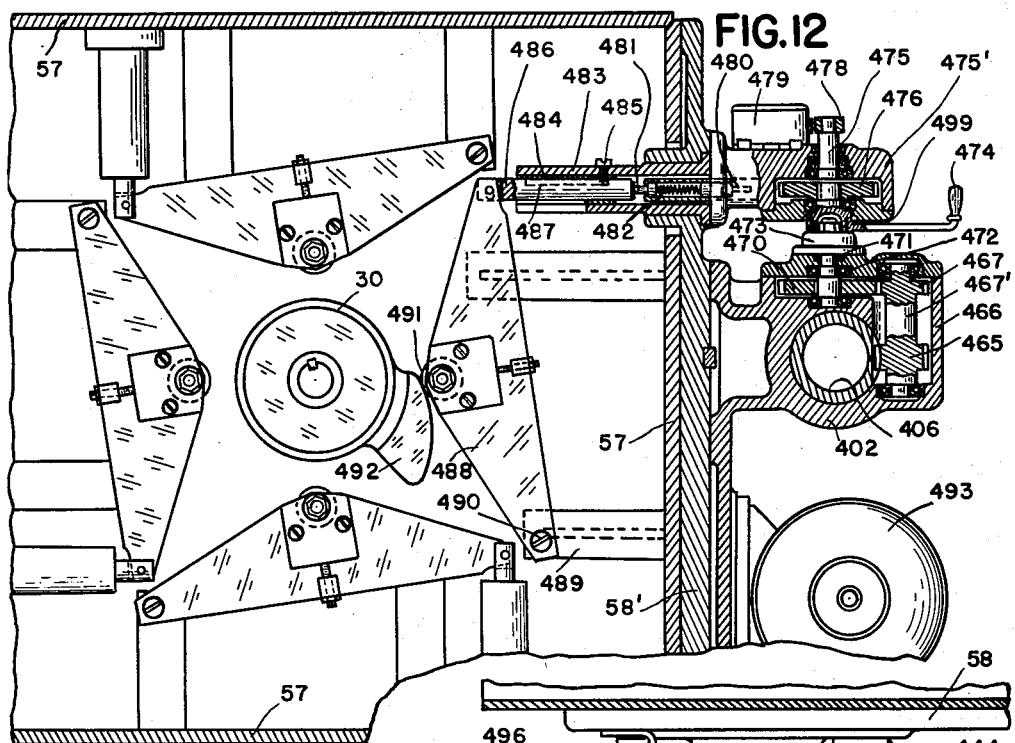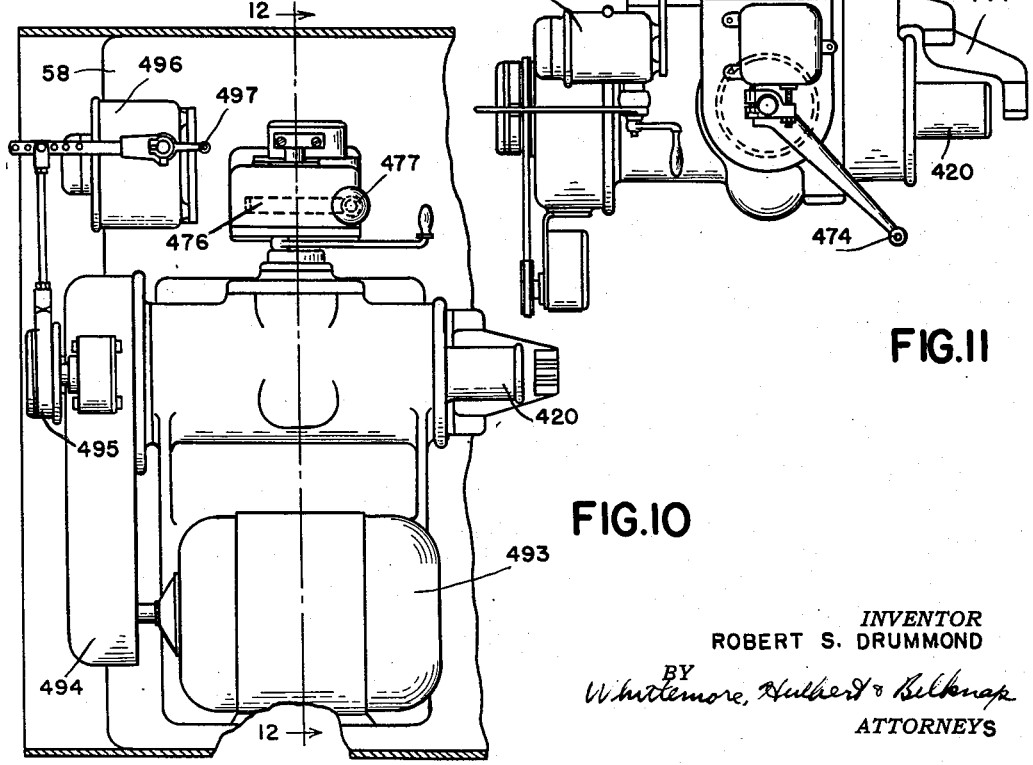

March 11, 1941.  R. S. DRUMMOND  2,234,553
MULTIPLE STATION SURFACE FINISHING MACHINE
Filed Nov. 29, 1937   11 Sheets-Sheet 8

INVENTOR
ROBERT S. DRUMMOND
BY
Whittemore, Hulbert & Belknap
ATTORNEYS

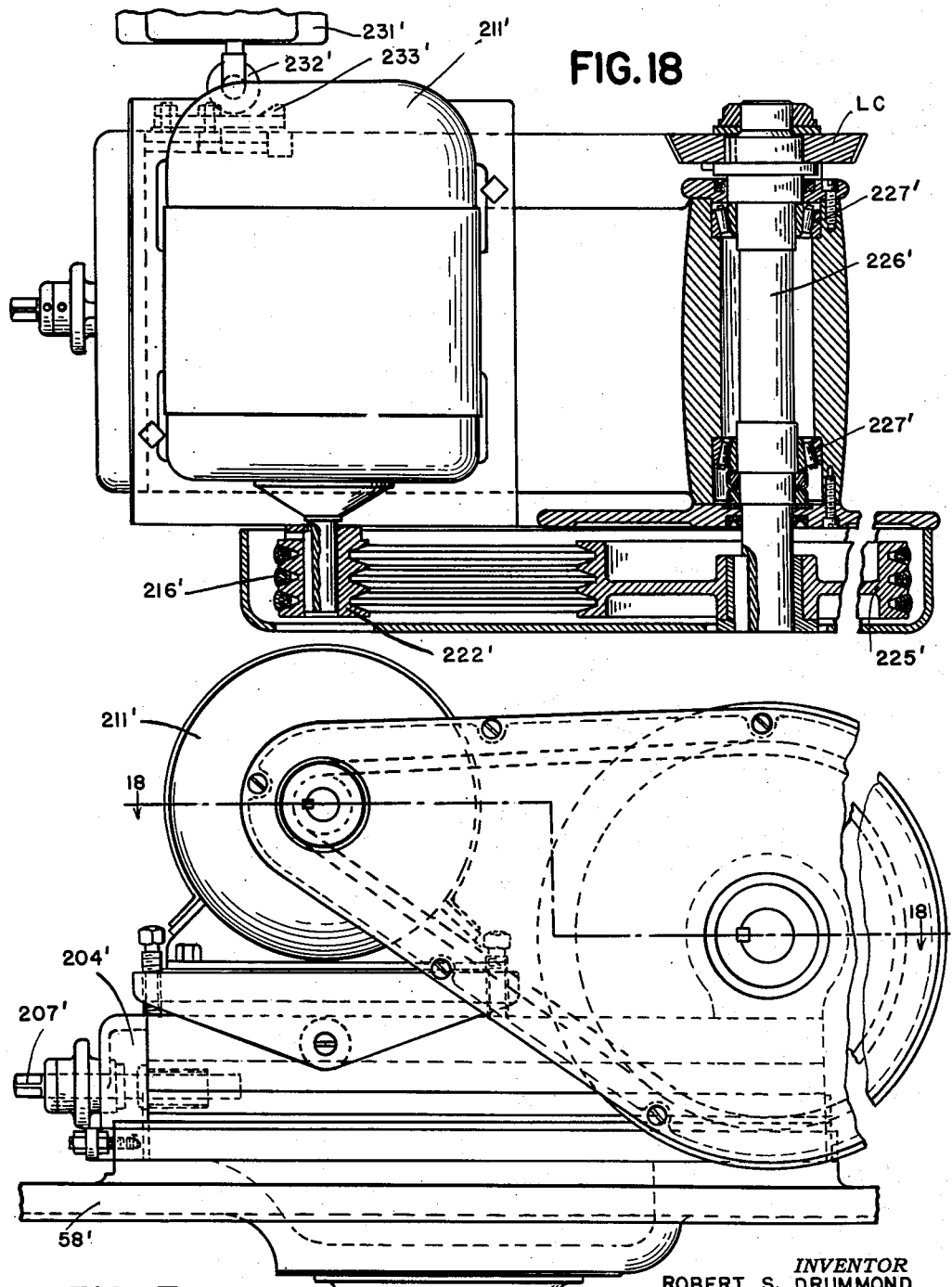

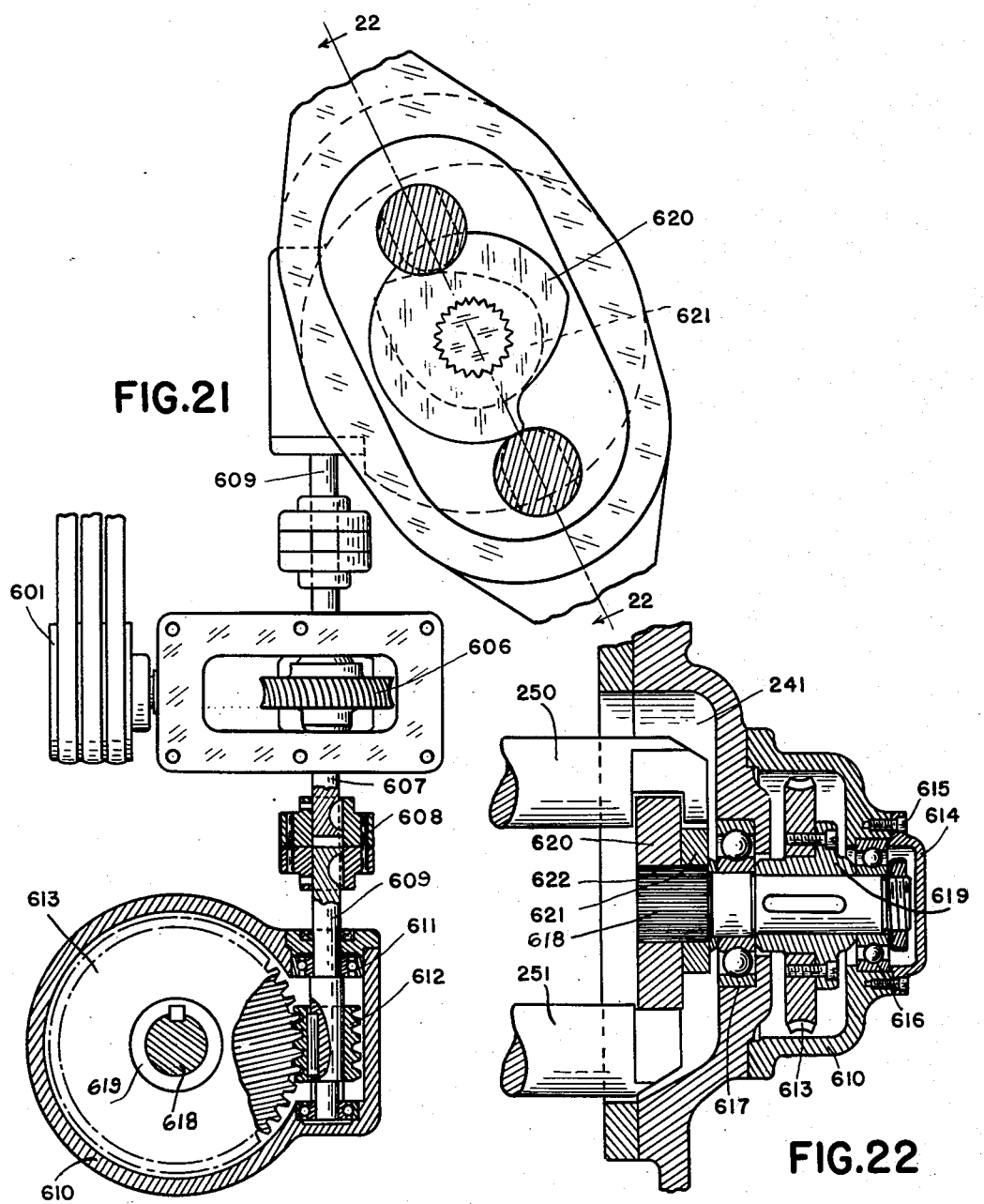

March 11, 1941.  R. S. DRUMMOND  2,234,553
MULTIPLE STATION SURFACE FINISHING MACHINE
Filed Nov. 29, 1937  11 Sheets-Sheet 11
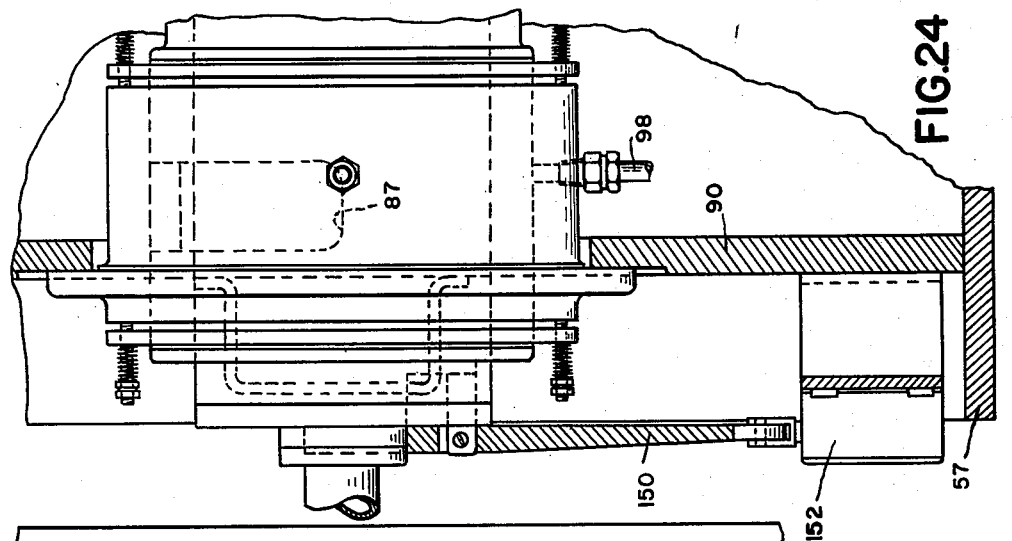
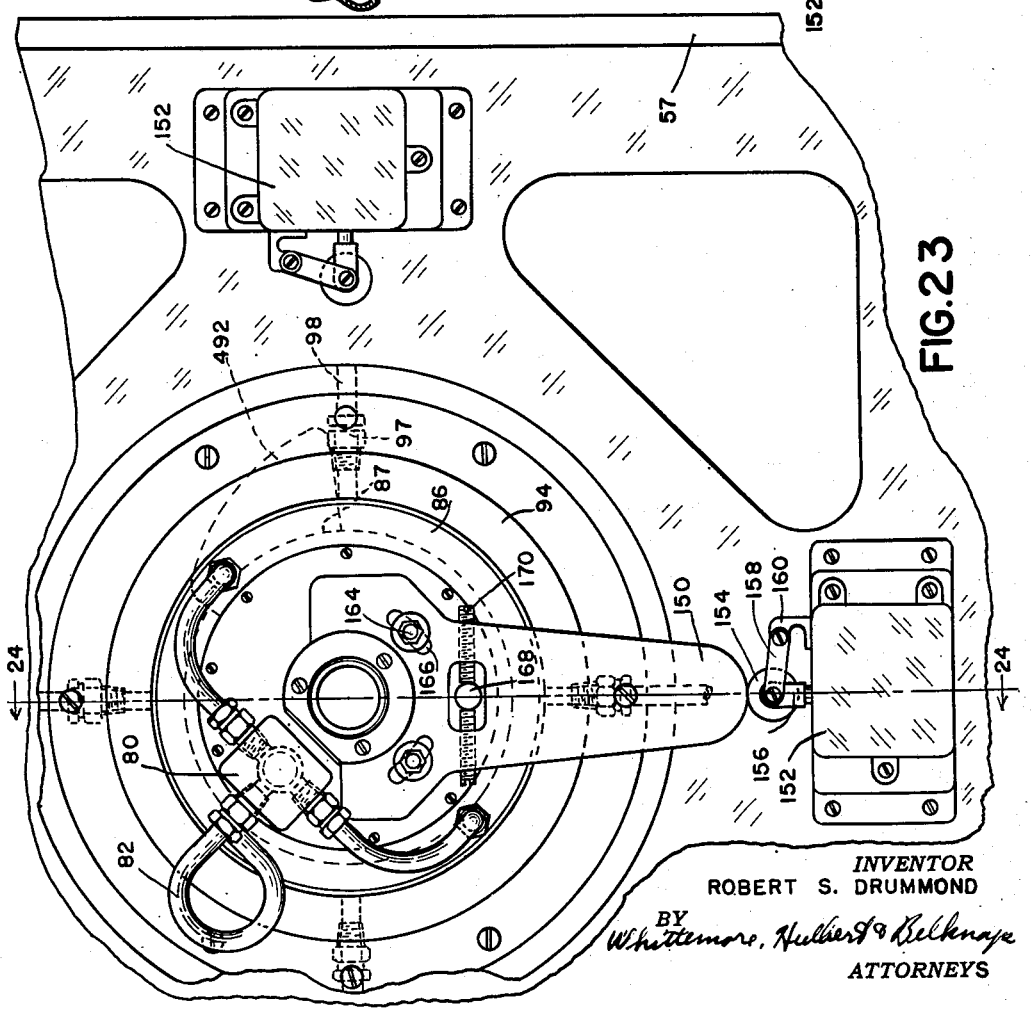
INVENTOR
ROBERT S. DRUMMOND
ATTORNEYS Patented Mar. 11, 1941

2,234,553

UNITED STATES PATENT OFFICE 2,234,553

MULTIPLE STATION SURFACE FINISHING MACHINE

Robert S. Drummond, Detroit, Mich., assignor to National Broach & Machine Company, Detroit, Mich., a corporation of Michigan Application November 29, 1937, Serial No. 177,147

29 Claims. (Cl. 90—11)

The invention relates to an automatic machine for finishing work pieces having surfaces of revolution. It is an object of the present invention to provide an automatic multiple station machine which is adapted for continuous operation and in operation will rapidly and accurately finish work pieces such, for example, as axle shafts.

It is a further object of the invention to provide an entirely automatic machine which requires only the insertion and removal of the work pieces by an operator.

It is a further object of the invention to provide a surface finishing machine which has a plurality of panels, each provided with automatic surface finishing mechanism, so arranged that each is adapted to pass a loading position where a finished work piece is removed and an unfinished work piece is inserted.

A further object of the invention is to provide a surface finishing machine having a plurality of independent surface finishing mechanism adapted to sequentially and automatically perform finishing operations.

It is a further object of the invention to provide a surface finishing machine in which a plurality of independent surface finishing mechanisms are controlled in timed sequence by a single timing means.

It is a further object of the invention to provide an automatic surface finishing machine in which independent surface finishing mechanism is adapted to be controlled by a single means.

It is a further object of the invention to provide an automatic surface finishing machine in which automatic mechanism is provided for chucking and unchucking the work piece.

A further object of the invention is to provide an automatically operated head stock which is adapted to automatically chuck and unchuck a work piece.

It is a further object of the invention to provide a multiple station surface finishing machine in which automatically controlled coolant conduits are provided for supplying the coolant to the individual cutting mechanisms while in operative relation and for cutting off the supply of coolant to the cutting mechanisms as they pass the loading station.

Other objects will be apparent as this description proceeds, and when taken in connection with the accompanying drawings, in which Figure 1 is a front elevation of the complete machine;

Figure 4 is a plan view of the main drive gear box;

Figure 5 is a section on the line 5—5 of Figure 4;

Figure 6 is a front elevation of the tail stock assembly;

Figure 7 is a section on the line 7—7 of Figure 6;

Figure 8 is a longitudinal section of the head stock assembly;

Figure 9 is a fragmentary end elevation of the head stock assembly;

Figure 10 is a fragmentary front elevation of the machine showing the head stock assembly;

Figure 11 is a fragmentary side elevation of the head stock assembly;

Figure 12 is a section on the line 12—12 of Figure 10;

Figure 17 is a side elevation of the left hand cutter assembly;

Figure 18 is a section on the line 18—18 of Figure 17;

Figure 19 is an axial section through the drive shaft of the feed drive mechanism;

Figure 20 is a section on the line 20—20 of Figure 19;

Figure 21 is an elevation partly in section of the connections between the drive shaft and the feed cam structure;

Figure 22 is a section on the line 22—22 of Figure 21;

Figure 23 is a plan of the top of the machine;

Figure 24 is a section on the line 24—24 of Figure 23.

Figure 1:
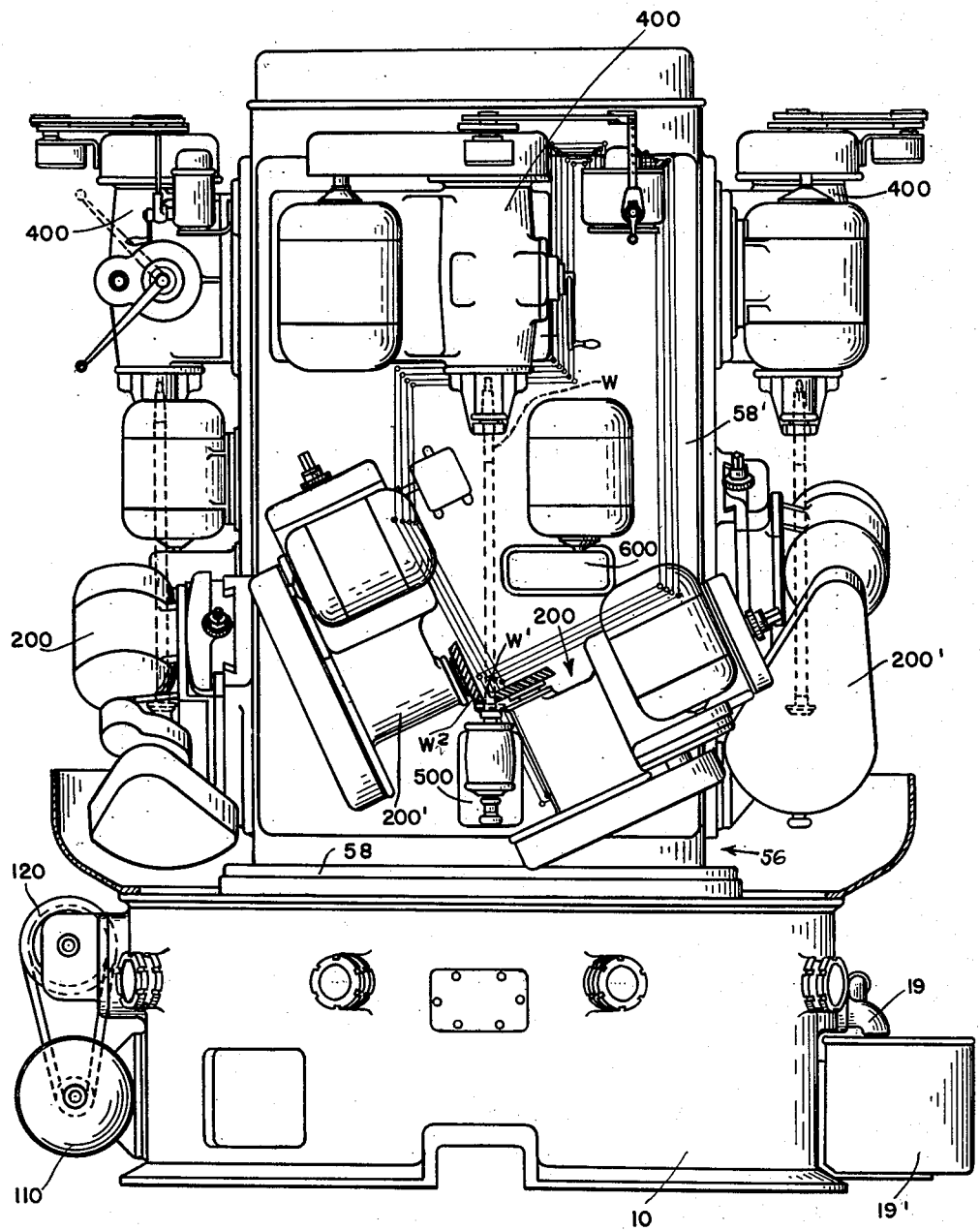

The present machine is based on the surface finishing machine shown in my copending application, Serial No. 124,790, filed February 8, 1937, Patent No. 2,200,544, May 14, 1940. In this type of machine a part to be finished such, for example, as W in Figure 1 is mounted for rotation between centers. Independent means are provided for rotating this work piece shown at 400 in Figure 1. In the example shown, the part W is an axle shaft having adjacent angularly related surfaces W' which is cylindrical and W² which is radial and right angularly related to surfaces W'. Tool carriages 200 and 206' are provided adjacent the surfaces to be finished. These carriages are mounted for translation toward and from the work piece and each carriage has a mounting thereon for a rotary finishing tool. Also carried by each carriage is a motor for rotating its respective tool. As disclosed in copending application above mentioned and in the present machine the carriages are mounted for translation along a path angularly related to the axis of the work. In the example illustrated, each tool has a component of motion as its carriage travels along its path which is perpendicular to the surface to be finished and a second component of motion which is parallel to the surface to be finished. Independent mechanism is provided indicated at 600 in Figure 1 for simultaneously feeding the tool carriages into the work to a predetermined depth and return.

General arrangement

The present machine contemplates the provision of a plurality of surface finishing mechanisms substantially similar to that disclosed in my copending application. These surface finishing mechanisms are mounted on a single carriage which in turn is constantly rotated by a worm driven by the motor 110 carried by the base 10. As the carriage 56 is rotated a stationary cam later to be described is supported from the base 10 and operates mechanism which raises the head stock 400 and releases the work piece W. The work piece W is retained in position by a suitable spring clip 449. The operator standing in front of the machine at the position where the head 400 is operated to release the work piece removes the finished work and replaces it with a piece to be finished. This occurs while the carriage is rotating past this loading position. Immediately after passing the loading position the head 400 is lowered into operative engagement with the work piece and a friction clutch engages the work piece and rotates it independently of the rotation of the tool elements. A second stationary cam carried from the stationary base 10 is adapted to operate switches which start the rotation of the four motors carried by each individual panel. These motors rotate the work and each tool and, in addition, through a suitable mechanism later to be described, feed the finishing tools in plunge cutting relation to the work and return. Upon completion of the working stroke a suitable limit switch is operated which stops rotation of all motors on the panel under consideration.

Figure 3:
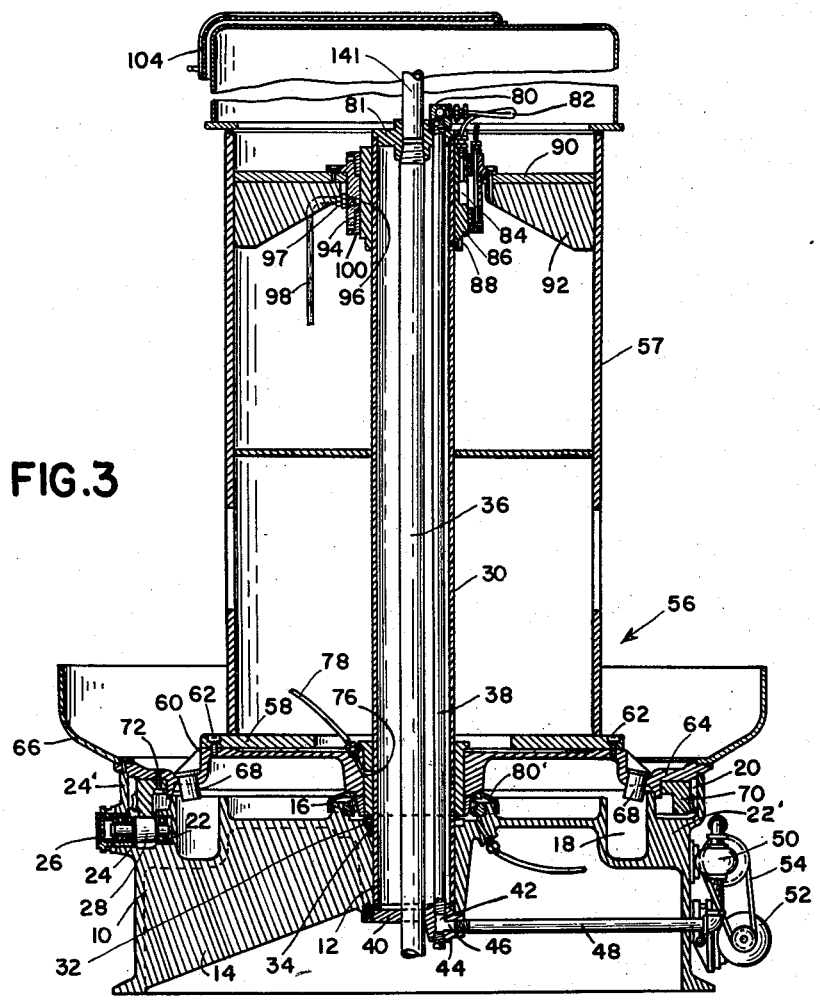
Figure 3 is a vertical section through the machine with panels and associated mechanism carried thereby omitted for clearness.
Figure 2:
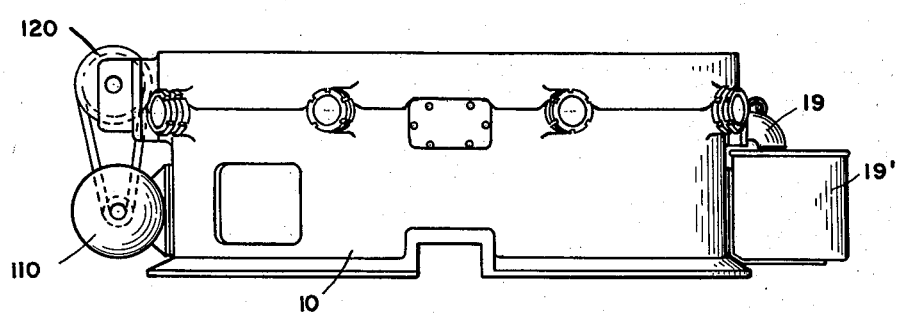
Figure 2 is a front elevation of the base for the machine.

The motor 110 is constantly rotated and as a result through a worm later to be described constantly rotates the table which carries the panels upon which are mounted the independent finishing mechanisms. A second motor 52 carried by the base operates a pump 50 which supplies coolant through a conduit which includes pipe 48, and intersecting drilled passages 46, 42 in a coupling member 44, pipe 38, manifold 80 and a plurality of flexible conduits 82 into an interrupted annular space 84, as best seen in Figure 3.

Base, table, and column assembly

The multiple station machine is adapted to be supported on base 10 which takes the form of a relatively low heavy casting, having a central collared aperture 12 and supporting webs 14. On the top of the base 10 an upstanding annular shoulder 16 forms a space in which is mounted guiding roller bearings 80'. Outwardly spaced therefrom is an upwardly opening channel 18 which is adapted to receive coolant as it drains back into the base from a drain pan 66 secured to the base 10 and connected to the channel 18 at spaced points by pipes 68. The outer edge of the channel 18 is formed by a wall portion 22' in which is formed at circumferentially spaced points outwardly opening recesses 22. The base portion, outwardly from the recesses 22, has an upwardly extending flange 24' which is provided with apertures 24 registering with the recesses 22. Heavy roller bearings 28 are mounted between the recesses and apertures, a cover 26 being provided to close and seal the recess. Received within the central aperture 12 in the base is a rigid tubular member 30. The member 30 is rigidly secured to the base by means of a ring 32 which is welded to the member 30 and is secured to the base 10 by a suitable securing means such as bolts 34.

The rotatable table generally indicated at 56, comprises a heavy column portion 57 which is square in the embodiment illustrated. The column 57 rests on plate 58 which in turn is secured to the table member 60 by suitable securing means such as bolts 62. At the upper end of column 57 an upper closure plate 90 is secured thereto and braced by suitable web pieces 92. Carried by the top closure plate 90 is a coolant manifold 94 to which at 90° intervals are connected nipples 97 and conduits 98 for conducting coolant to the cutter heads. Packing glands 100 are provided to prevent leakage of oil. Rigidly secured to the tubular member 30 by securing means such as bolts 88 is a cylindrical coolant valve 86 which is provided about its outer periphery with a channel 84. The channel 84 extends for an arc of substantially 270° thereabout and, as will be obvious, is adapted to afford communication to three of the coolant conduits 98 simultaneously. The other coolant conduit 98 to which flow of oil is shut off is the one which at that moment is passing the loading station. The top of the tube 30 is closed by a closure plate 81 which is centrally apertured to receive pipes 36 and 141. The pipes are provided to house the wiring by means of which current is supplied to the various motors carried by the rotating table and column. The top of the pipe 141 is in the form of a slip ring post.

The mechanism for rotating the table and associated column is best shown in Figures 4 and 5. As will be seen in these figures, a motor 110 is mounted on a bracket 112 which in turn is secured to the base 10 by means of a trunnion bearing 116, 114. Stud bolts 118 are provided on opposite sides of the trunnion bearing whereby the motor may be rocked about the trunnion bearing in order to adjust tension of its driving belt.

Referring again to Figure 3, the table 60 has bolted to the underside thereof as at 72 a circular rack 70. At a point opposite the rack 70 the base 10 has an aperture 124' surrounded by an outwardly extending annular projection 124. A housing 123 is bolted to flange 124 as by bolts 126 and is adapted to house gearing interconnecting the sheave 120 with the worm 148. The sheave 120 is keyed or otherwise suitably secured to shaft 128 which is journaled in the housing 123 and provided with suitable bearings 130. The shaft 128 carries pinion 132 which is adapted to mesh with the gear 134. The gear 134 is keyed to shaft 136. Suitable bearings 138 are provided in the housing for the shaft 136. A second gear 140 is secured to the opposite end of this shaft and is adapted to mesh with a gear 142 secured to shaft 144. Shaft 144 is journaled in bearings 146, 147 which extend within the space defined by the projecting flanges 124. The worm 148 is adapted to be in constant mesh with the rack 70. The motor 110 is connected to sheave 120 by flexible driving means such, for example, as the V-belt 119. As will be obvious, as long as the motor 110 is energized the table and column carrying the surface finishing mechanism will be continuously rotated.

A plate 58' is carried by each face of the square column 57. This plate is adapted to carry the head stock, tail stock, tool carriages and mechanism for feeding the tool carriages which will now be described in detail.

Tail stock assembly

The tail stock generally indicated at 500 and best shown in Figures 6 and 7, comprises a bracket 502 which is secured to the plate 58' by bolts 504 and key means 58. The bracket 502 is provided with an enlarged bore 506 in which is housed the tail stock assembly. This assembly comprises spaced bearings 512 with a spacer 508 positioned therebetween. Internally of the spacer is a spindle sleeve 510 which is rotatably supported by means of the bearings aforesaid. Received within the spindle sleeve is the spindle 514. The spindle is provided adjacent its rear end with screw threads 528 which are adapted to cooperate with corresponding screw threads on the interior of the spindle sleeve. A lock nut 530 is mounted in screw threaded relation on the spindle and is adapted to lock the spindle in predetermined relation to the spindle sleeve. A knurled knob 532 is provided at the end of the spindle by means of which the spindle is adapted to be rotated and thereby adjusted relative to the spindle sleeve and consequently the bracket. A cap 516 is provided to lock the bearing assembly 512 in position at the forward end of the tail stock and a second plate 522 is adapted to close the rear end of the bore and to surround the spindle. The spindle 514 is provided at its forward end with an outwardly cupped portion 514' and centrally thereof with a longitudinally extending bore 534. A centering pin 538 is slidably received within the bore 534 and is urged outwardly by means of a spring 540. The outward end of the pin 536 is provided with a reduced pointed conical portion which is adapted to center the work piece. The bracket 502 is provided at its forward end with an extension 542 to which is secured as by bolts 546 a guide member 544. This guide member has two parallel extensions 547 provided with inclined surfaces 548. The purpose of this guide is to assist the operator in centering the work piece. As will be obvious, it is only necessary to move the work piece against the guiding surfaces 548 in which position it will be accurately centered over the centering pin 536 and may then be allowed to engage the tail stock spindle proper. It will be understood that the work piece is supported on the panel in vertical position and that the tail stock is adapted to support the bottom on the work piece.

A guard plate 518 is secured to the forward exposed end of the spindle sleeve 510 by suitable securing means such as bolts 520.

Head stock assembly

The head stock 400 is adapted to be mounted adjacent the top of the panel 58' directly above the tail stock 500. The head stock is mounted in a head stock housing 402 which is secured to the keys 58" by means of flanges 401 by bolts 401'. The head stock housing 402 has an enlarged central bore 404 which is adapted to receive the removable head stock in slidable relation. Mounted in the bore 404 is a bearing housing 406 in which bearings 408 are mounted and separated by a spacer 410. The bearings are retained in assembled position by retainers 414 and 414'. The spindle 412 is received within the bearing housing in rotatable relation thereto through the medium of the bearings above mentioned. The spindle is provided at its forward end with a projecting annular collar 420 defining a chamber 420' therein. Within the chamber extends the center 422. Also mounted within the recess 420' is an automatic clutch mechanism 426 which will now be described.

Adjacent the outer end of the chamber is secured a roller chuck housing 428 which is keyed to the collar 420 by a key 428' bolted or otherwise secured as at 430 to the collar. The outer end of the chuck housing 428 is provided with an inwardly extending annular flange and an end plate 436 is secured to the opposite end of the chuck housing. Between the end plate 436 and the inwardly extending annular collar are provided alternate tapered rollers 438 and roller spacers 434. This entire assembly is slidably mounted within the space 420' and is retained therein against a compression spring 424 by an apertured clutch plate 440 secured to the collar 420 as by bolts 442. The head stock housing is provided with a forwardly extending bracket 444 which extends to a position in front of the open end of the head stock proper. This bracket 444 is provided at its upper end with inclined guide surfaces 448 which are so related to the aperture in the head stock that a work piece engaging both of the inclined surfaces is accurately centered with respect to the aperture. Spiral leaf springs 449 are provided adjacent the inclined surfaces, as best seen in Figure 9. The relationship is such that when the automatic head stock is withdrawn, unchucking the work piece, the springs 449 will be sufficient to retain the work piece in position.

As before stated, it is contemplated that the head stock in my improved surface finishing machine shall be automatically operated and to this end I provide the outer portion of the bearing housing 406 with a series of rack teeth 464. Suitable mechanism later to be described is provided which is adapted at a certain phase in the cycle to operate gear 465 which is received within an enlarged portion 466 of the head stock housing. As will be obvious from an inspection of Figure 8, rotation of gear 465 in a clockwise direction will cause retraction of the bearing housing spindle 412 and the associated parts within the space 420'. It is contemplated that the head stock will be withdrawn a distance sufficient to entirely free the same from the work piece. As before stated, the head stock and tail stock are vertically arranged so that the work piece will at this time be supported at its bottom against the tail stock and at its upper end by the springs 449 pressing the same against the inclined surfaces 448.

In order to provide for rotation of the head stock in any position of axial adjustment the rear portion of the spindle 412 has a reduced splined portion 454. The splined portion 454 is slidably received within a correspondingly splined cylindrical driving member 455. The driving member 455 has keyed thereto as at 457 a sheave 458 which is peripherally grooved as at 459 to receive the belts 460. The driver 455 and the sheave are retained in position by means of a locking nut 457'. This assembly is housed within a space provided between a closure member 450 which is bolted or otherwise secured as at 451 to the upper open end of the head stock housing and a housing member 452 which is bolted or otherwise secured as at 453 to the closure plate 450. The driver is rotatably supported within the closure plate 450 by suitable bearing means 456. The sheave 458 is connected by the V-belts 460 to a suitable driving motor 493. (See Fig. 10.)

On the rearward end of the driver 454 is secured a sheave 461 which is aligned with the sheave 462 carried by a bracket 463'. A friction relay 463 is carried by the bracket and operatively connected to the sheave 462. This relay functions in a well known manner to stop rotation of the head stock immediately upon deenergization of the motor. Such an arrangement is desirable because of inertia of the motor and associated parts.

*Automatic control for head stock spindle*

As stated above, suitable automatic mechanism is provided for retracting the head stock as the panel approaches the loading position. This mechanism is best shown in Figures 10 to 12. Figure 12 illustrates a cam 492 secured to the column 30. This cam is adjustably supported but in operation will remain stationary. As can be seen, as the column 57 rotates (in a clockwise direction in Figure 12) the cam 492 is adapted to engage a roller 491 carried intermediate a lever 488. This lever is pivoted at one end as at 490 to a post 489 and its other end is connected by a suitable loose connection to a plunger 486. The panel member 58' secured to the plate 57 has secured in an aperture therein an inwardly extending bushing support 483. A bushing 484 is provided within the bushing support and a guiding bolt 485 projects through both the bushing support and the bushing to engage in a groove 487 in the plunger 486. Secured to the outer side of the panel 58' in aligned position relative to the bushing support is a housing 475'. Within this housing in slidable relation is supported a rack 477 (see Figure 10). A projection on the rack extends into the bushing 484 to a point adjacent the plunger 486. This projection is bored and has a relatively strong compression spring 482 therein. A slidable button 481 is provided in the end of the projection against which the spring 482 bears. The relationship is such that in normal operation the plunger 486 engages the button and through the intermediacy of the spring actuates the rack 477. If for any reason any of the moving parts which are actuated through the rack 477 are arrested, the button and spring are adapted to be moved relative to the extension to prevent breaking of parts. The housing 475' is provided with a closure 499 which provides therein an enclosed space in which is secured a gear 476. The gear 476 is keyed to shaft 475 which is mounted in suitable bearings in the housing. On the outer end of the shaft is provided a cam 478 which is arranged to cooperate with a limit switch 479 to prevent actuation of the driving motors while the head stock is in retracted position.

The gear 476 is in operative engagement with the rack 477 and as the column 57 rotates so that cam 492 operates plunger 486, rotation will obviously be imparted to gear 476. Rotation of gear 476 is transferred through a double acting fixture lock 473 to a shaft 471 within the head stock housing. Suitable bearings 472 are provided for the shaft 471 and a gear 470 is carried thereby. A second gear 467 carried by a shaft 467' engages gear 470 and a third gear 465 is carried by the opposite end of shaft 467. The gear 465, best seen in Figure 8, operatively engages with the rack teeth 464 on the bearing housing 406 in a manner to raise and lower the head stock assembly.

The double acting fixture lock referred to is of the type which permits movement to be transmitted therethrough when the applied force comes from one side of the lock but which prevents such movement when the moving force is on the other side of the lock. As used here, this lock permits the cam and associated rack and pinion mechanism to raise the head stock. After the roller 491 has passed the cam 492, the operating handle 474 of the fixture lock must be operated in order to permit the head stock to return to operative position. In addition the fixture lock serves the function of preventing the head stock from being raised or loosened by extraneous force such, for example, as vibration when such force is applied directly to the head stock assembly.

Mechanism for oiling the slides which support the carriages is provided and takes the form of a forced feed lubricator 496 which is adapted to be operated by means of an eccentric 495 operated from the motor 493 which also rotates the head stock. The handle 497 is provided in order that feed may be accelerated manually, if desired.

*Cutter head assembly*

Figure 13:
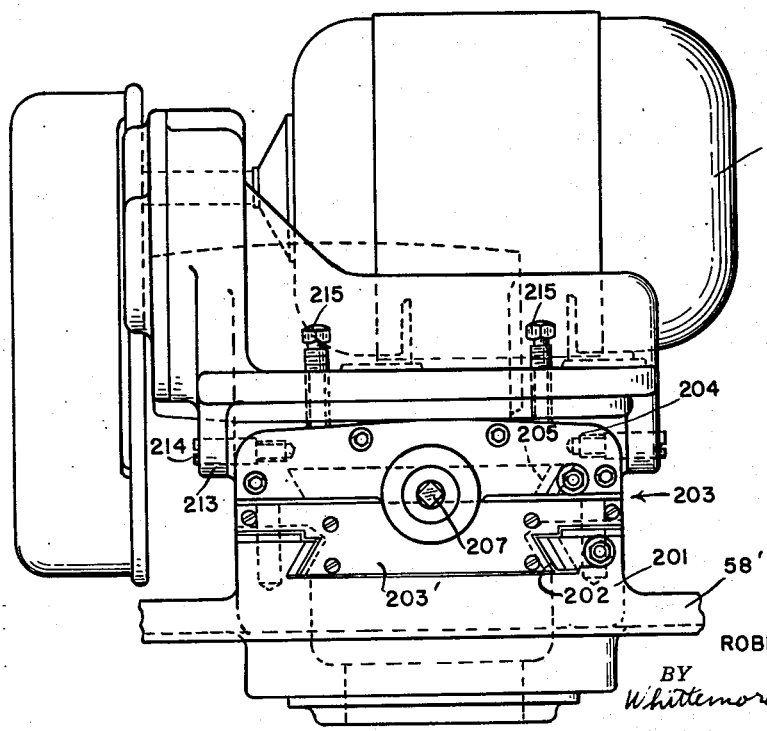
Figure 13 is an end elevation of the right hand cutter assembly.

Two cutter heads are provided, one indicated at 200 in Figure 1 being referred to herein as the right hand cutter. This cutter is adapted to shave on the cylindrical surface of the axle. The cutter head assembly comprises a carriage 203 which is provided with a slide 203' mounted in ways 202 formed in a projection 201 on the plate 58'. These ways, as indicated in Figure 13, have hardened inserts to take the bearing. Suitable mechanism later to be described is provided which reciprocates the carriage 203. The slide 203' is provided with a second set of ways 205 on which is slidably mounted a base 204.

Means for providing for a relative adjustment between base 204 and slide 203' is provided and takes the form of a threaded member 206 carried by the base 204 and having threaded engagement in a portion of the slide 203'. The outer end of threaded member 206 is squared as at 207 for cooperation with a suitable detachable handle and a scale 208 is provided to indicate the adjustment.

Figure 14:
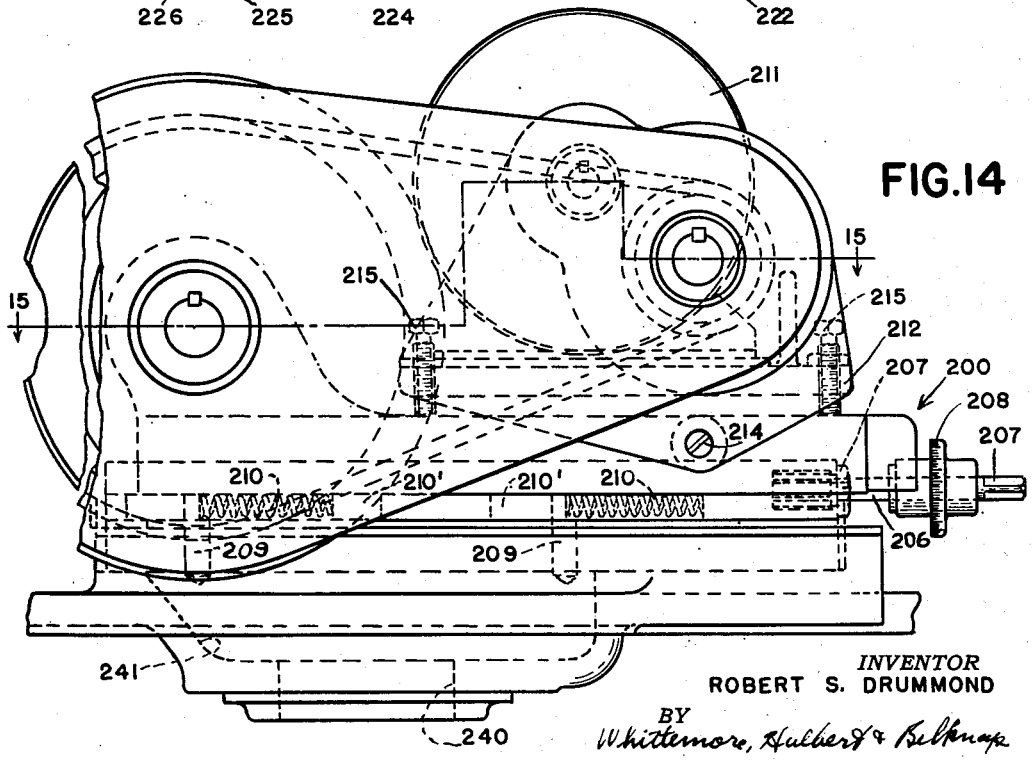
Figure 14 is a side elevation partly in section of the right hand cutter assembly.

Since this cutter head is adapted to reciprocate in an oblique direction it is desirable to counteract its weight by spring means and these are provided at 210. Suitable studs 209 are secured to the guide 201 and extend upwardly into the path of portions of the slide 203. Suitable recesses 210' are provided in the slide 203' to house the springs 210. As shown in Figure 14, two pairs of springs are provided and these springs are selected so that they effectively counterbalance the weight of the cutter head assembly.

Figure 15:
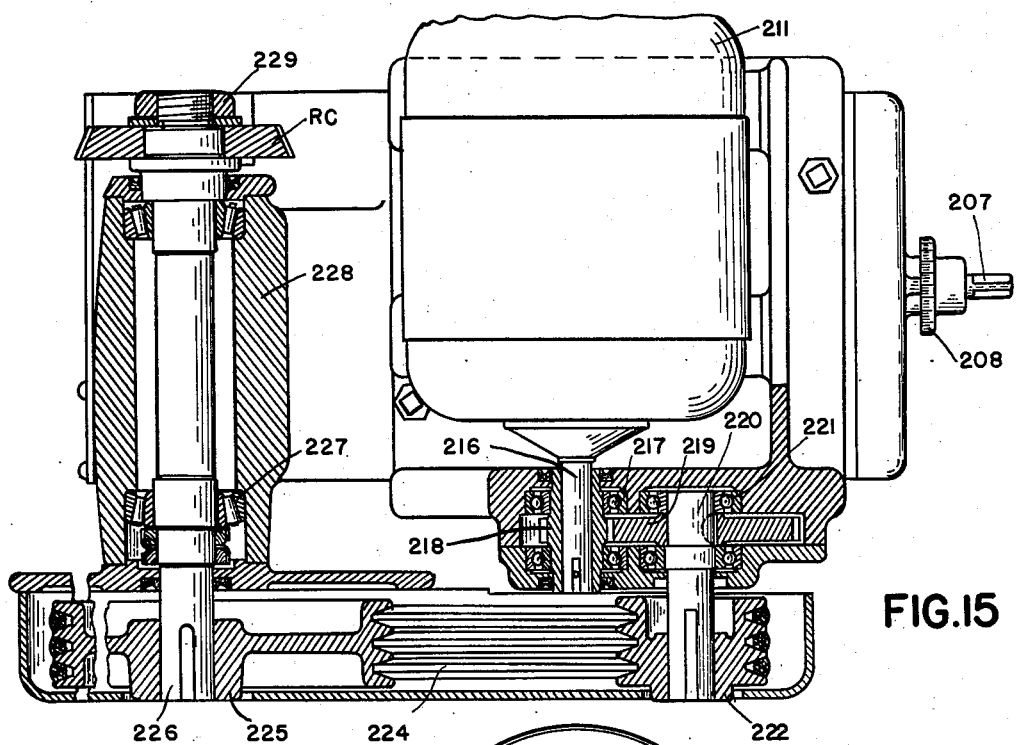
Figure 15 is a section on the line 15—15 of Figure 14.

A driving motor 211 is secured to the base 204 by means of a trunnion connection 213 comprising pivots 214. Pairs of stud bolts 215 on opposite sides of the trunnion axis are adapted to adjust the motor about this axis and at the same time to maintain the motor support rigid. This adjustment is for the purpose of tensioning the belt 224. As best seen in Figure 15, the motor shaft 216 is keyed to a motor pinion 218 which is supported in suitable bearings 217. Motor pinion 218 meshes with a gear 219 which is keyed to a shaft 220 mounted in suitable bearings 221. The shaft 220 has keyed to the outer end thereof a sheave 222 provided with suitable circumferential grooves to receive the V-belt 224. The cutter RC is secured to shaft 226 which is provided with suitable thrust bearings 227 and the cutter is locked to the shaft by a nut 229. The shaft 226 is keyed or otherwise secured to a sheave 225 which is provided with suitable peripheral grooves to receive the V-belt 224. Rotation of the motor 211 drives the cutter through the bearing and belt just described.

Figure 16:
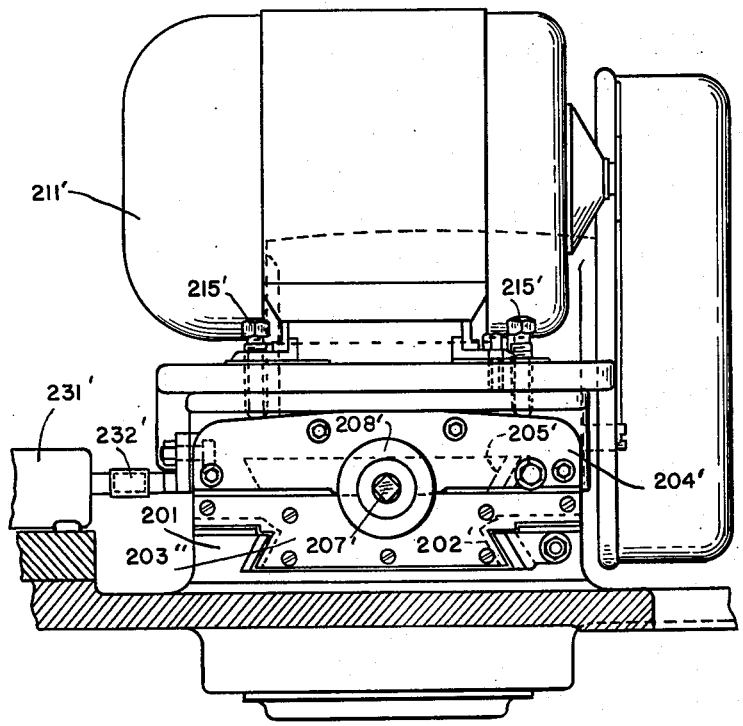
Figure 16 is an end elevation of the left hand cutter assembly.

In Figures 16 to 18, I have illustrated the left hand cutter and the reference numerals applied thereto correspond to the reference numerals applied to Figures 13 to 15 illustrating the right hand cutter head assembly except that the same have been primed. The arrangement of the two cutter heads are broadly similar and no description will be given of the left hand cutter head assembly except to point out that the motor 211' is directly connected to the sheave 222' rather than through the intermediacy of reduction gearing. The operation and adjustment of the two cutter heads are identical. As shown in Figures 16 and 18, a limit switch 231' is mounted on the frame in position to be actuated by a cam or lug 233'. Switch 231' has a spring pressed, roller equipped plunger 232'. Switch 231', when actuated on the return stroke of the carriage, interrupts operation of all motors carried by the corresponding panel, and marks the termination of the cutting cycle of that panel. The next cycle is initiated by actuation of switch 152 by cam 150, shown in Figures 23 and 24. Switches 152 and 231' operate suitable relays, and a detailed explanation of the circuits is believed unnecessary.

*Feed drive assembly*

The mechanism for driving both cutter heads is illustrated in Figures 19 to 22.

As indicated in Figure 1, the mechanism for driving the reciprocating tool carriages indicated generally at 600 is driven by a motor mounted on the outside of the panel 58'. The mechanism associated with the motor and with the reciprocating tool carriages is for the most part on the inside of the column.

As best seen in Figures 19 and 20, the feed drive motor is connected to a sheave 601 through registering apertures in the column and in the panel 58'. The sheave 601 is connected to a shaft 602 by suitable securing means. A housing 604 is connected to the inside of the column and is adapted to house a portion of the gear train which interconnects the sheave 601 and the cams 620 and 621 which are eventually driven thereby. Journaled in the housing in suitable bearings 603 is the shaft 602 to which is keyed or otherwise secured a worm 605. Also journaled in the same housing is a shaft 607 to which is keyed a worm wheel 606, the worm wheel being arranged in meshing engagement with the worm 605.

The shaft 607 extends from both sides of the housing 604 and is adapted to be connected to two separate feed drive mechanisms. This arrangement is illustrated in Figure 21 where the shaft 607 is shown connected through the flexible couplings 608 to shafts 609. The feed drives associated with shaft 609 include a housing 610 in which is journaled in suitable bearings 616 and 617 a shaft 618. Connected to the shaft 618 by keys is a hub 619 to which is bolted or otherwise secured a gear 613. The gear 613 is adapted to mesh with a worm 612 which is keyed to shaft 609.

Rotation of the motor drives the sheave 601 and through the gear train which includes worm 605, gear 606, worm 612 and gear 613 rotates the two shafts 618.

The housing 610 is mounted internally of the column at a point just under the mounting for the carriages which carry the cutting tools. A chamber 241 is provided on panel 58' and a pair of feed posts 250 and 251 which are rigidly secured to the slide of the feed carriage project into this space.

Connected to the outer end of the shaft 618 are a pair of cams 620 and 621 whose shape is best illustrated in Figure 21. The feed posts 250 and 251 are formed to cooperate with the cams, as best seen in Figure 22. The feed post 251 engages the cam 620 and the shape of the cam is such that upon rotation of the cam the feed post is moved in a direction to move the tool carriage toward the work. The feed post 250 has a cut-out portion to receive the cam 620 without engaging therewith and has an upward portion adapted to be engaged by the cam 621. This last feed post and cam is provided for the purpose of returning the carriage after completion of a cutting stroke. As can be seen in Figure 21, the cams and feed posts are so arranged that one cam is at all times driving its corresponding feed post. This results in a positively controlled feed stroke and a positively controlled return stroke. The shape of the cam 620 is such that for a predetermined rate of rotation of the driving motor the desired rate of feed of the cutting tool into the work will result. The foregoing describes how one carriage is driven from shaft 609, reciprocation being positive in either direction through cams 620, 621. The other end of shaft 609 positively moves the cooperating tool carriage through a similar but differently shaped pair of cams driven by gear 613.

The outer portion of the shaft 618 and the inner diameters of the cams 620 and 621 are provided with relatively fine corrugations which serve to connect the cams to the driving shaft and which also provide for relative adjustment of the cams. This is accomplished by withdrawing the cams from the driving shaft and replacing them thereon at the desired adjusted position.

A retainer plate 614 is secured to the inner open end of housing 610 by means of bolts 615 or other suitable securing means and serves to close the housing as well as retain the ball race which carries the bearings 616 in position.

By a proper design of cam the feed may be accurately controlled as to velocity and the return stroke may be, if desired, relatively fast as compared to the feed stroke. The cams are readily removable and cams of different contour may be substituted in order to provide various feeding rates.

Starting controls and coolant valve

Controls for the motors carried by the panels 58' are illustrated in Figures 23 and 24. A plurality of switches 152 are carried by the rotatable column. Each switch 152 is adapted to initiate operation of the four motors carried by the corresponding panel. The switch includes a bracket 160 with a link 158 pivoted thereto as shown and a roller 154 secured to the opposite ends of the link. Connected to the link 158 is a plunger 156 which is adapted to operate the switch mechanism. The rollers 154 are positioned such that upon rotation of the table and column they will be moved in a circular path which will be intersected by a stationary cam 150 secured to the stationary tube 30. The cam 150 is adjustably mounted and for this purpose arcuate slots 166 are provided by means of which the cam is adapted to be clamped to the supporting structure in adjusted position by means of stud bolts 164. Adjustment is obtained by means of bolts 170 threaded through apertures in the cam 150 and engaging a stud 168 which projects through an enlarged aperture in the cam.

As will be readily apparent from the foregoing, rotation of the table causes sequential operation of the switches 152. In other words, as the table and column rotates the motors on each panel will be started as their controlling switch 152 passes stationary cam 150.

In the cutting operation performed by my improved shaving machine it is necessary to provide a stream of coolant at the cutting point. For this purpose and by mechanism previously described, a flow of coolant under pressure is constantly delivered to the manifold 80 and from this manifold by conduits 82 to the interrupted annular space 87 in the coolant valve 86. Spaced at 90° intervals about the coolant valve and carried by a coolant exhaust manifold 94 are four nipples 97 each connecting to a conduit 98 which leads to the point of cutting operation on the corresponding panel. The position of the coolant valve is predetermined with relationship to the starting cam 150 and the relationship is such that the supply of coolant is cut off as the panel under consideration passes the loading station. At this time, due to the operation of limit switch 231' the rotation of the work and of the cutting tools is stopped.

Also, as seen in Figure 23 at 492, is the cam which operates the head stock retracting mechanism. The position of this member relative to the coolant valve and to the starting cam 150 is also accurately predetermined so that the sequential operation of the machine is accurately predetermined.

Operation

The operation of my improved multiple station shaving machine should be apparent from the foregoing description but will be briefly reviewed here. Upon initiating operation of the machine a suitable switch (not shown) is actuated which starts rotation of the main drive motor 110 as well as the coolant feed pump motor 52. These motors operate continuously while the machine is in operation. The main drive motor 110 drives the worm 148 which meshes with the circular rack 70 and constantly rotates the table 60, the column 57 and the plurality of panels 58' associated with each side of the column. The coolant pump motor 52 continually drives the coolant pump and a supply of coolant is forced to the 270° annular space 84 in the coolant valve 86. This space is in constant communication with three (in the embodiment shown) of the four conduits 98 leading to the respective cutter heads.

The machine may be designed to operate at any desired or convenient speed but I have found that the specific embodiment illustrated is best adapted to complete a revolution of the table and column in about 28 seconds. Since four cutting assemblies are provided this provides a maximum interval of seven seconds for the operator to unload a finished work piece and to replace it with a work piece to be finished as the particular panel passes the loading.

In initiating operation it is assumed that all of the panels are unloaded. As the first panel enters the loading station the cutter heads are in retracted position and the limit switch 231' has been operated to shut down all of the motors carried by the panel. As the table and column enter the loading position the cam follower 491 encounters the stationary cam 492 and operates to raise the automatic head stock. The coolant valve has at this time shut off the flow of coolant to the cutter heads on this panel. It is necessary only for the operator to take a work piece to be finished and place the same with portions engaging the inclined guiding surfaces 548 of the tail stock. The next step is to then lower the work piece upon the tail stock where it will be accurately centered by the pin 536. The top of the work piece is then swung toward the head stock which is in retracted position until the end of the work piece is engaged by the leaf springs 449. These springs are of sufficient strength to hold the work piece in vertical position against the guiding surfaces 448.

Continued rotation of the table and column moves the cam follower 491 out of the engagement with the cam 492. This continued rotation of the table and column corresponds to a movement of an individual panel and its associated mechanism out of the loading station and the disengagement between the cam follower 491 and the cam 492 causes downward movement of the head stock, subject to release of the fixture lock 473. Motion of the head stock towards engaging position of the work piece is directly downward and gravity tends to move the head stock toward this position. Such movement, however, is prevented by the double acting fixture lock 473. It is necessary for the operator by manipulation of the handle 474 to release the fixture lock and to return the head stock to operative position.

As the head stock moves downwardly the automatic clutch previously described engages the end of the work piece. This clutch includes tapered rollers 438 and when the work piece has firmly engaged these rollers the clutch assembly is moved upwardly within the space 420' until the head stock center 422 engages a correspondingly shaped part on the work piece accurately centered on the same. It will be understood that upward motion of the clutch relative to the center 422 is actually brought about by a downward motion of the head stock spindle while the clutch assembly is held stationary against the upper end of the work piece.

Continued rotation of the table and column eventually causes the engagement of cam follower 154 and stationary cam 150 which initiates simultaneous operation of the four motors carried by the corresponding panel. The motors carried by the tool carriages are positively connected to the tools by gearing and flexible connectors, as previously described. Rotation of the head stock motor causes rotation of the work piece by means of the conventional friction clutch. Rotation of the motor connected to the feed drive starts translation of the tool carriages along their ways toward the work piece. The final translation is at a predetermined slow rate, in accordance with the desired rate of cutting. Since the work piece and the cutting tools are both rotating a cutting action takes place on the surfaces to be finished. This cutting action in the type of machine disclosed is itself novel and has been more fully described in applicant's copending application referred to.

Due to the operation of the cams and cooperating feed posts the feed movement is interrupted when the tools have cut to the predetermined desired depth and the carriages are then returned to retracted position at a desired rate. Return of one of the carriages causes operation of the limit switch 231' which stops rotation of the four motors carried by that panel. Continued rotation of the driven parts due to inertia is stopped by means of the friction relay previously described. Limit switch 479 prevents further motor actuation until the head stock is in engagement with the work.

The operation of a single mechanism comprising a work support and associated tool supports may be considered as involving a separate cycling means for each mechanism effective to move the tools in plunge cutting relation and to terminate a cycle by actuating switch 231'. The cycle of each mechanism is initiated by a single control member, the cam 150. The switch 479 then prevents further automatic control until actuated by lever 474 incidental to gripping a new work piece.

Completion of the return stroke and consequent stopping of the various driving motors occurs just prior to the re-entry of the panel under consideration into the loading zone. At this time, as the panel again enters the loading zone, flow of coolant to the cutter heads is cut off and due to the next operation of the head stock retracting means the finished work piece is supported on the tail stock 500 and with its upper end loosely held by means of the leaf springs 449. At this second passing of the panel under consideration through the loading zone the operator's duties are precisely similar to those previously described except that he must first remove the finished work piece from the machine. This is accomplished by simply wtihdrawing the top of the work piece from the leaf springs and lifting the same from the tail stock.

It is desired to call attention here to an important feature of the construction which I have just described. As will be noted, the panels 58' are independently and removably mounted on the column. In addition, each panel carries the complete assembly of surface finishing mechanism, namely, a tail stock 500, a power head stock 400, and cutter and motor assemblies 200 and 200'. Each panel is therefore a complete operating assembly and it is possible to remove a single panel for repair or other purposes without disturbing the operation of the remaining panels. Each panel carries in addition to its surface finishing mechanism the necessary motors for operating the mechanism and in addition, control means for the motors and control means for actuating the power head stock. The various control means, namely, the switch 152 and the head stock and its controlling mechanism including the gear 476 and associated parts, are adapted to be operated from a single operating means which includes the cam 492, and the switch actuator 150. Omission of a single panel therefore does not affect the timed and interrelated control of the remaining panels by the control means just mentioned.

From the foregoing it will be apparent that I have devised a new and improved surface finishing machine which permits a single operator to multiply his productiveness. The machine is entirely automatic in operation, the only step which requires the attendance of an operator being the simple step of removing the finished work piece and replacing it with a piece to be finished.

While I have shown a single embodiment which includes all of the novel features of my invention, it is to be understood that the machine could take many different forms and various additions, omissions, modifications and substitutions are contemplated within the scope of the invention. Furthermore, while I have shown a complete machine it will be readily apparent that various features of my improved machine are novel and need not be included in the particular machine disclosed nor in a machine similar thereto but have novelty and utility apart from any particular machine.

What I claim as my invention is:

1. A multiple station surface finishing machine comprising a plurality of separate finishing mechanisms, means for moving said mechanisms serially repeatedly past a loading position, means associated with each mechanism for gripping a work piece, means automatically controlled by the approach of each mechanism to the loading position to release said gripping means, and resilient means holding said work piece in position after the release of said gripping means.

2. A multiple station surface finishing machine comprising a plurality of separate finishing mechanisms, means for moving said mechanisms serially repeatedly past a loading position, means associated with each mechanism for gripping a work piece, means automatically controlled by the approach of each mechanism to the loading position to release said gripping means, and resilient means holding said work piece in position after the release of said gripping means, said resilient means comprising surfaces and cooperating springs to releasably retain said work piece against said surfaces.

3. In a multiple station surface finishing machine comprising a plurality of separate finishing mechanisms and having means for moving said mechanisms serially repeatedly past a loading position: means associated with each mechanism for gripping a workpiece, and means automatically controlled by the approach of each mechanism to the loading position to release said gripping means, said gripping means including a relatively fixed tail stock, and a head stock movable toward and from said tail stock to grip the work piece therebetween.

4. In a multiple station surface finishing machine comprising a plurality of separate finishing mechanisms and having means for moving said mechanisms serially repeatedly past a loading position: means associated with each mechanism for gripping a work piece, and means automatically controlled by the approach of each mechanism to the loading position to release said gripping means, said gripping means including a relatively fixed tail stock, a head stock movable toward and from said tail stock to grip the work piece therebetween, and resilient means holding said work piece in position after the release of said gripping means.

5. In a multiple station surface finishing machine comprising a plurality of separate finishing mechanisms and having means for moving said mechanisms serially repeatedly past a loading position: means associated with each mechanism for gripping a work piece, and means automatically controlled by the approach of each mechanism to the loading position to release said gripping means, said gripping means including a relatively fixed tail stock, a head stock movable toward and from said tail stock to grip the work piece therebetween, and resilient means holding said work piece in position after the release of said gripping means, said resilient means comprising surfaces and cooperating springs to releasably retain said work piece against said surfaces.

6. In a multiple station surface finishing machine comprising a plurality of separate finishing mechanisms and having means for moving said mechanisms serially repeatedly past a loading position: means associated with each mechanism for gripping a work piece, and manual means operable only after said mechanism has partly traversed the loading position to operate said gripping means to engage a work piece, said gripping means including a relatively fixed tail stock, and a head stock movable toward and from said tail stock to grip the work piece therebetween.

7. In a multiple station surface finishing machine comprising a plurality of separate finishing mechanisms and having means for moving said mechanisms serially repeatedly past a loading position: means associated with each mechanism for gripping a work piece, and means automatically controlled by the departure of each mechanism from the loading position to operate said gripping means to engage a work piece, said automatically controlled means including a locking means which prevents operation of said gripping means, and a manual means to release said locking means, said gripping means including a relatively fixed tail stock, and a head stock movable toward and from said tail stock to grip the work piece therebetween.

8. In a multiple station surface finishing machine comprising a plurality of separate finishing mechanisms and having means for moving said mechanisms serially repeatedly past a loading position: means associated with each mechanism for gripping a work piece, means automatically controlled by the departure of each mechanism from the loading position to operate said gripping means to engage a work piece, and guiding means for holding said work piece in position to be engaged by said gripping means, said guiding means including guiding surfaces and resilient means for holding said work piece against said surfaces, and said gripping means including a relatively fixed tail stock, and a head stock movable toward and from said tail stock to grip the work piece therebetween.

9. In a multiple station surface finishing machine comprising a plurality of separate finishing mechanisms and having means for moving said mechanisms serially repeatedly past a loading position: means associated with each mechanism for gripping a work piece, and means automatically controlled by the approach of each mechanism to the loading position to release said gripping means, and by the departure of said mechanism from the loading position to operate said gripping means to engage a work piece, said gripping means including a relatively fixed tail stock, and a head stock movable toward and from said tail stock to grip the work piece therebetween.

10. In a multiple station surface finishing machine comprising a plurality of separate finishing mechanisms and having means for moving said mechanisms serially repeatedly past a loading position: means associated with each mechanism for gripping a work piece, means automatically controlled by the approach of each mechanism to the loading position to release said gripping means, and by the departure of said mechanism from the loading position to operate said gripping means to engage a work piece, and releasable means for retaining a finished work piece in position when released by said gripping means until manually withdrawn, and to receive a work piece to be finished in position to be engaged by said gripping means, said gripping means including a relatively fixed tail stock, and a head stock movable toward and from said tail stock to grip the work piece therebetween.

11. In a multiple station machine for finishing surfaces of revolution comprising a plurality of separate finishing mechanisms and having means for moving said mechanisms serially repeatedly past a loading station: work supporting and rotating means for each mechanism comprising a relatively fixed tail stock, a relatively movable power head stock having an automatic clutch, and means automatically controlled by the approach of said mechanism to the loading station to retract said head stock from the work piece and to disengage said clutch.

12. In a multiple station machine for finishing surfaces of revolution comprising a plurality of separate finishing mechanisms and having means for moving said mechanisms serially repeatedly past a loading station: work supporting and rotating means for each mechanism comprising a relatively fixed tail stock, a relatively movable power head stock having an automatic clutch, means automatically controlled by the approach of said mechanism to the loading station to retract said head stock from the work piece, and by the departure of said mechanism from the loading station to move said head stock into position to engage a work piece, and manually releasable supporting means for retaining said work piece in position after retraction of said head stock until manually removed, and for supporting an unfinished work piece in position to be engaged by said gripping means, said clutch being disengaged during retraction of said headstock.

13. In a multiple station machine for finishing surfaces comprising a base, a support rotatably mounted on said base, a plurality of finishing mechanisms mounted about said support, means on said base for rotating said support and said finishing mechanisms past a loading station: the said mechanism including a tool carriage movable toward and from the work, motor means for moving said tool carriage toward the work and return, and automatic means controlled by departure of each mechanism from the loading station for initiating operation of said motor means.

14. In a multiple station machine for finishing surfaces comprising a base, a support rotatably mounted on said base, a plurality of finishing mechanisms mounted about said support, means on said base for rotating said support and said finishing mechanisms past a loading station: the said mechanism including a tool carriage movable toward and from the work, motor means for moving said tool carriage toward the work and return, automatic means controlled by departure of each mechanism from the loading station for initiating operation of said motor means, and separate means controlled by the return of said carriage to initial position for stopping said motor means.

15. In a multiple station machine having a plurality of separate cutting mechanisms arranged to move said mechanisms serially repeatedly past a loading station, and having a work support for each mechanism: a work support as aforesaid comprising relatively movable stocks, resilient means adjacent one stock to receive a work piece and retain the same in proper position to be engaged by said adjacent stock, and to retain the work piece in position after separation of said stock from the work piece.

16. In a multiple station machine having a plurality of separate cutting mechanisms arranged to move said mechanisms serially repeatedly past a loading station, and having a work support for each mechanism: a work support as aforesaid comprising relatively movable stocks, means automatically controlled by the approach of said mechanism to the loading station to separate said stocks, means intermediate said stocks to releasably position a work piece in position to be gripped between said stocks, and means automatically controlled by passage of said mechanism past said loading station for relatively moving said stocks to clamp said work piece.

17. In a multiple station machine having a plurality of separate cutting mechanisms arranged to move said mechanisms serially repeatedly past a loading station, and having a work support for each mechanism: a work support as aforesaid comprising relatively movable stocks, means automatically controlled by the approach of said mechanism to the loading station to separate said stocks, means intermediate said stocks to releasably position a work piece in position to be gripped between said stocks, and means automatically controlled by passage of said mechanism past said loading station for relatively moving said stocks to clamp said work piece, and a manually operated lock for retaining said stocks separated and operable to release said stocks for clamping movement.

18. In a multiple station machine having a plurality of separate cutting mechanisms, means arranged to move said mechanisms serially repeatedly past a loading station, and having a work support for each mechanism: a work support as aforesaid comprising a relatively fixed tailstock, a headstock movable toward and from said tailstock to clamp and release a work piece therebetween, manually releasable means for positioning a work piece in said tailstock, means responsive to passage of said mechanism past said loading station for moving said headstock first away from and then toward said tailstock, and a manually releasable lock preventing movement of said headstock toward said tailstock.

19. A multiple station machine comprising a rotatable support, means for rotating said support, a plurality of work supports on said rotatable support, tool supports for each work support, a cam, means carried by each work support engageable with said cam to release a work piece, and manually operable means associated with said work support for controlling subsequent clamping of a work piece thereon.

20. A multiple station machine comprising a rotatable support, means for rotating said support, a plurality of work supports on said rotatable support, tool supports for each work support, a coolant conduit for each work support, a coolant manifold fixed relative to the rotatable support having an incomplete annular chamber, said conduits terminating in a circular element engaging and closing one side of said chamber.

21. A multiple station machine comprising a rotatable support, means for rotating said support, a plurality of work supports on said rotatable support, tool supports for each work support, means for intermittently supplying coolant to said work supports comprising a pair of circular relatively rotatable engaging members defining therebetween an incomplete annular chamber, one of said members being rotatable with said support and having conduits communicating with said chamber and provided with outlets adjacent said work support.

22. A multiple station machine comprising a rotatable column, a fixed support for said column, a plurality of mechanisms including tool and work supports, independent motive means for said mechanisms, timing means for said motive means carried in part by said fixed support, and manually controlled means for cutting out one or more of said mechanisms independently of the others.

23. A multiple station machine comprising a rotatable column, a fixed support for said column, a plurality of mechanisms including tool and work supports, independent motive means for said mechanisms, timing means for said motive means adapted to definitely terminate a cutting cycle of each mechanism in sequence, and manually releasable means preventing initiation of a succeeding cycle of each mechanism by said timing means.

24. A multiple station machine comprising a plurality of independent mechanisms each including a tool support and a work support, manually controlled means for gripping a work piece in a work support, means associated with said last named means for conditioning said mechanism for subsequent automatic control, automatic means for thereafter initiating and definitely terminating a cutting cycle, and means effective on termination of said cutting cycle to prevent further automatic control until actuation of said manual means.

25. A multiple station machine comprising a plurality of independent mechanisms each including a tool support and a work support, manually controlled means for gripping a work piece in a work support, means associated with said last named means for conditioning said mechanism for subsequent automatic control, automatic means for thereafter initiating and definitely terminating a cutting cycle, and means effective on termination of said cutting cycle to release said work piece and to prevent further automatic control until actuation of said manual means.

26. A multiple station machine having a plurality of separate mechanisms movable serially repeatedly past a loading station, each mechanism including a work support, a tool support, and motor means for relatively driving and feeding said supports, separate cycling means for each mechanism adapted to control the relative drive and feed of said supports and to terminate a cycle, and a single control member effective after each mechanism has passed said loading station to initiate operation of each of said cycling means.

27. A multiple station machine having a plurality of separate mechanisms movable serially repeatedly past a loading station, each mechanism including a work support, a tool support, and motor means for relatively driving and feeding said supports, separate cycling means for each mechanism adapted to control the relative drive and feed of said supports and to terminate a cycle, a single control member effective after each mechanism has passed said loading station to initiate operation of each of said cycling means, and manual means operable at said loading station to selectively permit or prevent initiation of said cycling means for each of said mechanisms.

28. A multiple station machine having a plurality of separate mechanisms movable serially repeatedly past a loading station, each mechanism including a work support, a tool support, and motor means for relatively driving and feeding said supports, separate cycling means for each mechanism adapted to control the relative drive and feed of said supports and to terminate a cycle, a single control member effective after each mechanism has passed said loading station to initiate operation of each of said cycling means, and means automatically effective after termination of a cycle to release a work piece for removal from said work support and to prevent initiation of another cycle by said mechanism, and manual means operable at said loading station to restore control of said mechanism to said control member and cycling means.

29. A multiple station machine comprising a rotatable multiple-sided column, a panel carried by each side of said column in independently removable relation, independent metal working mechanism carried by each panel, actuating means for each mechanism carried by said panels and removable as a unit therewith, cycling means for performing a desired operation and terminating the cycle, and single control means separate from said panels adapted to transfer control of said actuating means to said cycling means to initiate a cycle, and effective after termination of said cycle by said cycling means to transfer control of said actuating means from said cycling means.

ROBERT S. DRUMMOND.